US012527227B2

(12) United States Patent
Suzuki et al.

(10) Patent No.: US 12,527,227 B2
(45) Date of Patent: Jan. 13, 2026

(54) ACTUATOR DEVICE

(71) Applicant: HAMAMATSU PHOTONICS K.K., Hamamatsu (JP)

(72) Inventors: Daiki Suzuki, Hamamatsu (JP); Takuma Osaki, Hamamatsu (JP); Makoto Nozaki, Hamamatsu (JP); Kota Sugizaki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 925 days.

(21) Appl. No.: 17/736,161

(22) Filed: May 4, 2022

(65) Prior Publication Data

US 2022/0367783 A1 Nov. 17, 2022

(30) Foreign Application Priority Data

| May 12, 2021 | (JP) | ................................. 2021-080857 |
| May 12, 2021 | (JP) | ................................. 2021-080861 |
| Sep. 1, 2021 | (JP) | ................................. 2021-142427 |

(51) Int. Cl.
*H10N 30/87* (2023.01)
*G02B 26/08* (2006.01)
(Continued)

(52) U.S. Cl.
CPC ....... *H10N 30/875* (2023.02); *G02B 26/0816* (2013.01); *H10N 30/204* (2023.02); *H10N 30/802* (2023.02)

(58) Field of Classification Search
CPC .. H10N 30/875; H10N 30/802; H10N 30/204; G02B 26/0816
(Continued)

(56) References Cited

U.S. PATENT DOCUMENTS

| 11,567,100 B2 | 1/2023 | Reinke |
| 11,581,480 B2 | 2/2023 | Akahane |
| (Continued) | | |

FOREIGN PATENT DOCUMENTS

| CN | 115340059 A | 11/2022 |
| CN | 115417369 A | 12/2022 |
| (Continued) | | |

OTHER PUBLICATIONS

Machine translation of Tanaka et al. JP 2020187292, Nov. 19, 2020 (Year: 2020).*

(Continued)

*Primary Examiner* — Bumsuk Won
(74) *Attorney, Agent, or Firm* — Faegre Drinker Biddle & Reath LLP

(57) ABSTRACT

A metal substrate supported by a wiring substrate includes a movable portion, a first extending portion, a first coupling portion that couples the first extending portion and the movable portion, and a first connection portion connected to the first extending portion. The first connection portion includes a first fixing region fixed to the wiring substrate, and a first connection region connected to the first extending portion and to the first fixing region. The first connection region includes a first bent portion. The first bent portion has a first outer edge on a movable portion side, and a second outer edge opposite the movable portion, and each of the first outer edge and the second outer edge is bent toward the movable portion side when viewed in a Z-axis direction.

7 Claims, 10 Drawing Sheets

(51) Int. Cl.
  *H10N 30/20*   (2023.01)
  *H10N 30/80*   (2023.01)
(58) Field of Classification Search
  USPC ........................................................ 310/311
  See application file for complete search history.

(56) References Cited

U.S. PATENT DOCUMENTS

| | | | |
|---|---|---|---|
| 2010/0110527 | A1 | 5/2010 | Liu et al. |
| 2010/0327703 | A1 | 12/2010 | Uetani et al. |
| 2013/0301099 | A1* | 11/2013 | Mizoguchi ........... G02B 26/101 |
| | | | 359/226.1 |
| 2016/0049574 | A1 | 2/2016 | Iwazaki et al. |
| 2017/0199375 | A1* | 7/2017 | Naono ............... H10N 30/8554 |
| 2017/0217764 | A1 | 8/2017 | Li et al. |
| 2018/0040514 | A1 | 2/2018 | Goh et al. |
| 2018/0062065 | A1* | 3/2018 | Arakawa ................ H10N 30/88 |
| 2018/0088336 | A1* | 3/2018 | Hino ....................... G02B 27/20 |
| 2018/0151796 | A1 | 5/2018 | Akahane |
| 2018/0226563 | A1 | 8/2018 | Kijima et al. |
| 2020/0073113 | A1 | 3/2020 | Nystrom |
| 2020/0363631 | A1 | 11/2020 | Luizzi et al. |
| 2021/0140993 | A1 | 5/2021 | Reinke |
| 2021/0343925 | A1 | 11/2021 | Saito et al. |
| 2022/0365337 | A1* | 11/2022 | Suzuki ................. H10N 30/204 |
| 2022/0367783 | A1 | 11/2022 | Suzuki et al. |
| 2022/0367786 | A1* | 11/2022 | Suzuki ................. H10N 30/802 |

FOREIGN PATENT DOCUMENTS

| | | |
|---|---|---|
| JP | H7-128361 A | 5/1995 |
| JP | H10-315485 A | 12/1998 |
| JP | 2010-103987 A | 5/2010 |
| JP | 2011-150038 A | 8/2011 |
| JP | 2011-179015 A | 9/2011 |
| JP | 2012-058367 A | 3/2012 |
| JP | 2012-078389 A | 4/2012 |
| JP | 2012-247523 A | 12/2012 |
| JP | 2013-114014 A | 6/2013 |
| JP | 2013-164278 A | 8/2013 |
| JP | 2014-160140 A | 9/2014 |
| JP | 2015-018047 A | 1/2015 |
| JP | 2016-081986 A | 5/2016 |
| JP | 2017-156522 A | 9/2017 |
| JP | 2019-045770 A | 3/2019 |
| JP | 2019-125777 A | 7/2019 |
| JP | 2019-132906 A | 8/2019 |
| JP | 2020-027893 A | 2/2020 |
| JP | 2020-187292 A | 11/2020 |
| JP | 2021-087135 A | 6/2021 |
| JP | 2022-176027 A | 11/2022 |
| JP | 2022-176066 A | 11/2022 |
| JP | 7367494 B2 | 10/2023 |
| JP | 7672925 B2 | 5/2025 |
| WO | 2015/064423 A1 | 5/2015 |
| WO | 2015/198513 A1 | 12/2015 |

OTHER PUBLICATIONS

Office Action issued May 30, 2025 in related U.S. Appl. No. 17/736,178.

Office Action issued May 28, 2025 in related U.S. Appl. No. 17/736,146.

Notice of Allowance mailed Jun. 3, 2025 in U.S. Appl. No. 17/736,136.

* cited by examiner

ACTUATOR DEVICE

TECHNICAL FIELD

The present disclosure relates to an actuator device.

BACKGROUND

An actuator device has been known which includes a support body; a metal substrate supported by the support body; and a vibration element disposed on a main body portion included in the metal substrate. In such an actuator device, the metal substrate further includes a movable portion; a pair of extending portions extending from the main body portion such that the movable portion is located therebetween; a pair of coupling portions that couple the pair of extending portions and the movable portion; and a pair of connection portions connected to the pair of extending portions, and a portion of each connection portion may be fixed to the support body (for example, refer to Japanese Unexamined Patent Publication No. 2020-187292).

In the actuator device described above, the support body expands or contracts because of a change in environmental temperature, so that unwanted stress acts on each coupling portion and on the main body portion via the part of each connection portion fixed to the support body, and as a result, a desired driving characteristic cannot be obtained, for example, the resonant frequency of the metal substrate is changed, which is a concern.

SUMMARY

An object of the present disclosure is to provide an actuator device in which a desired driving characteristic can be stably obtained, for example, even when the environmental temperature changes.

An actuator device according to one aspect of the present disclosure includes: a support body; a metal substrate supported by the support body; and a vibration element disposed on a main body portion included in the metal substrate. The metal substrate further includes a movable portion, a first extending portion and a second extending portion extending from the main body portion such that the movable portion is located between the first extending portion and the second extending portion, a first coupling portion coupling the first extending portion and the movable portion, a second coupling portion coupling the second extending portion and the movable portion, a first connection portion connected to the first extending portion, a second connection portion connected to the second extending portion, and a third connection portion connected to the main body portion. The first connection portion includes a first fixing region fixed to the support body, and a first connection region connected to the first extending portion and to the first fixing region. The second connection portion includes a second fixing region fixed to the support body, and a second connection region connected to the second extending portion and to the second fixing region. The third connection portion includes a third fixing region fixed to the support body, and a third connection region connected to the main body portion and to the third fixing region. The first connection region includes a first bent portion. The second connection region includes a second bent portion. The first bent portion has a first outer edge on a movable portion side, and a second outer edge opposite the movable portion. The second bent portion has a third outer edge on the movable portion side, and a fourth outer edge opposite the movable portion. Each of the first outer edge and the second outer edge is bent toward the movable portion side when viewed in a thickness direction of the metal substrate. Each of the third outer edge and the fourth outer edge is bent toward the movable portion side when viewed in the thickness direction of the metal substrate.

DETAILED DESCRIPTION

Figure 1:
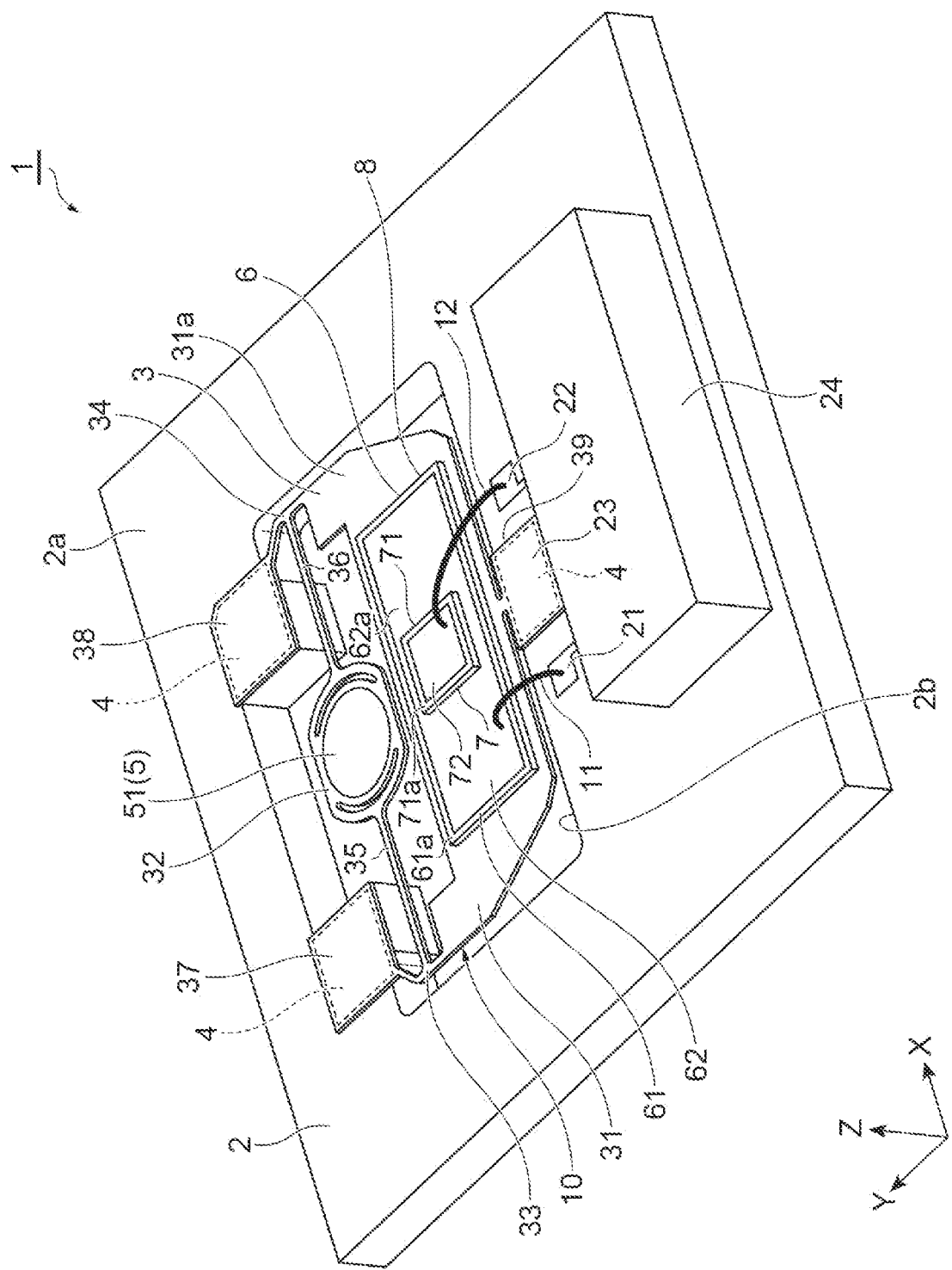
FIG. 1 is a perspective view of an actuator device of one embodiment.

Hereinafter, an embodiment of the present disclosure will be described in detail with reference to the drawings. Incidentally, in the drawings, the same or equivalent portions are denoted by the same reference signs, and duplicated descriptions will be omitted.

[Configuration of Actuator Device]

Figure 2:
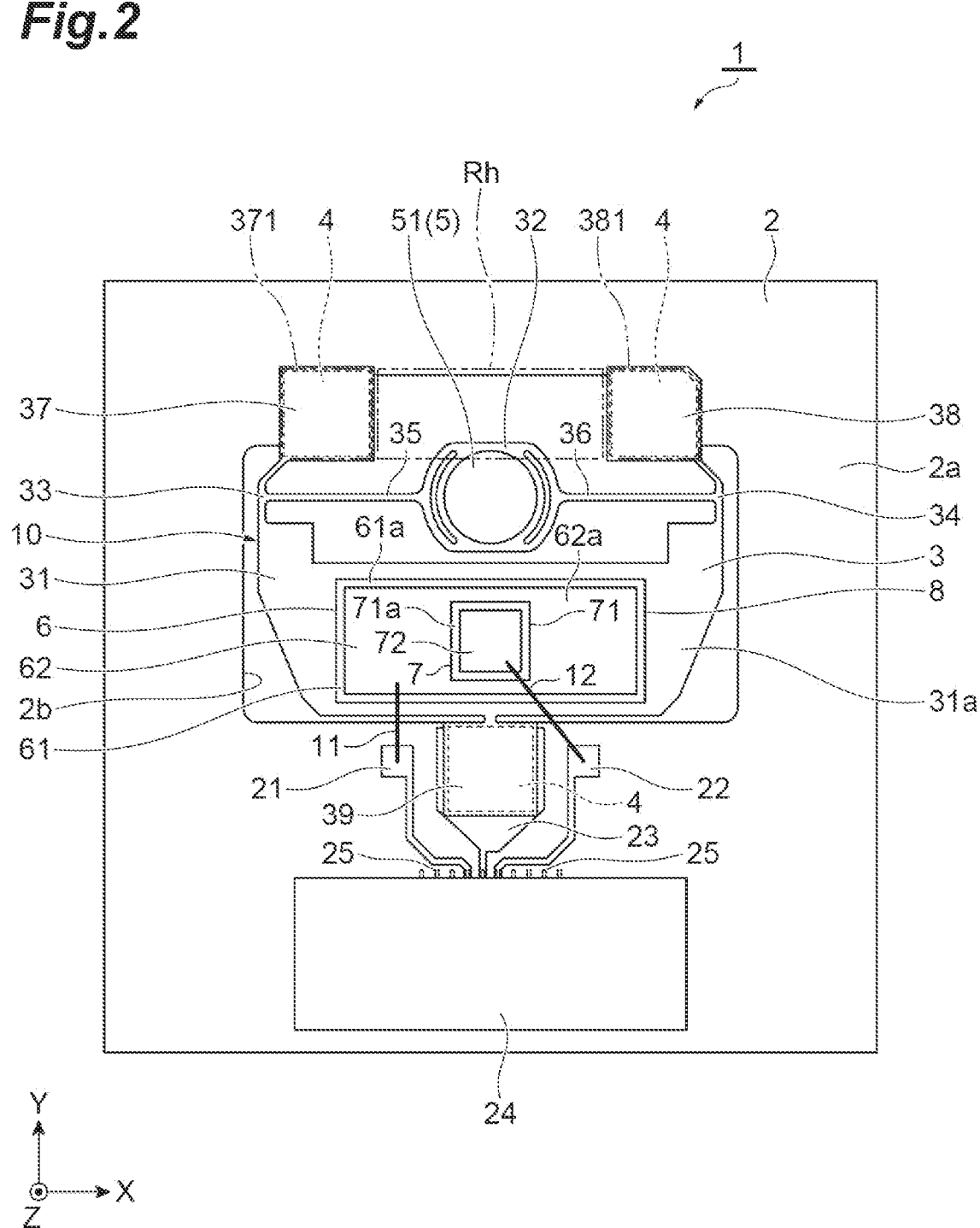
FIG. 2 is a plan view of the actuator device illustrated in FIG. 1.

As illustrated in FIGS. 1 and 2, an actuator device 1 includes a wiring substrate (support body) 2; a metal substrate 3; a first bonding member 4; an optical function unit 5 having an optical surface 51; a piezoelectric drive element (vibration element) 6; a piezoelectric detection element 7; and a second bonding member 8. The optical function unit 5 is provided on the metal substrate 3. The actuator device 1 is housed, for example, in a package (not illustrated). As one example, the package includes side walls, a bottom wall, and a top wall made of a material that transmits light, and has a box shape. For example, in the actuator device 1, when laser light is incident into the package via the top wall, the laser light is reflected by the optical surface 51 of the optical function unit 5 that is caused to periodically oscillate via the metal substrate 3 by the piezoelectric drive element 6, and is output to the outside via the top wall. An output direction of the laser light from the package changes periodically and continuously according to oscillation of the optical surface 51. Namely, in the present embodiment, the actuator device 1 is an optical scanning device.

The wiring substrate 2 has a placement surface 2a. An opening 2b that is open on the placement surface 2a and on a surface opposite the placement surface 2a is formed in the wiring substrate 2. The wiring substrate 2 has, for example, a rectangular frame shape. Examples of the material of the wiring substrate 2 include silicon, ceramic, quartz, glass, and plastic. As the wiring substrate 2, it is possible to use, for example, a glass composite substrate (CEM-3) in which a base material obtained by mixing a glass fabric and a non-woven glass fabric is impregnated with an epoxy resin, a glass epoxy substrate (FR-4) in which layers of glass fiber fabrics are impregnated with an epoxy resin, a heat dissipation metal substrate in which copper, aluminum or the like is used as a base material, or the like. The thickness of the wiring substrate 2 may be set to a thickness with which sufficient rigidity can be secured, and is, for example, 0.8 mm or more. In the present embodiment, the thickness of the wiring substrate 2 is 1.6 mm. In the following description, a thickness direction of the wiring substrate 2 is referred to as a Z-axis direction (thickness direction of the metal substrate), one direction perpendicular to the Z-axis direction is referred to as an X-axis direction, and a direction perpendicular to both the Z-axis direction and the X-axis direction is referred to as a Y-axis direction (direction in which a main body portion 31 and a movable portion 32 are arranged).

A plurality (in the present embodiment, three) of electrode pads 21, 22, and 23 are disposed on the placement surface 2a of the wiring substrate 2. The plurality of electrode pads 21, 22, and 23 are located on one side in the Y-axis direction with respect to the opening 2b of the wiring substrate 2, and are arranged along the X-axis direction. A connector 24 is attached to the placement surface 2a. The connector 24 is a port through which a voltage signal or the like is input to or output from each of the piezoelectric drive element 6 and the piezoelectric detection element 7. The connector 24 is located, for example, on one side in the Y-axis direction with respect to the plurality of electrode pads 21, 22, and 23. The connector 24 includes a plurality of terminals 25. The connector 24 is electrically connected to the plurality of electrode pads 21, 22, and 23 via the plurality of terminals 25, wirings of the wiring substrate 2 and the like.

The metal substrate 3 is supported by the wiring substrate 2. The metal substrate 3 is made of, for example, iron-based, stainless-based, copper-based, permalloy-based, titanium-based, tungsten-based, molybdenum-based metal, or the like, and has a plate shape. The thickness of the metal substrate 3 is, for example, 50 to 500 μm. The first bonding member 4 bonds the wiring substrate 2 and the metal substrate 3. The first bonding member 4 has conductivity. Examples of the material of the first bonding member 4 include an epoxy resin containing Ag particles.

The metal substrate 3 includes the main body portion 31; the movable portion 32; a first extending portion 33; a second extending portion 34; a first coupling portion 35; a second coupling portion 36; a first connection portion 37; a second connection portion 38; and a third connection portion 39. The movable portion 32, the first extending portion 33, the second extending portion 34, the first coupling portion 35, the second coupling portion 36, the first connection portion 37, the second connection portion 38, and the third connection portion 39 are integrally formed.

The main body portion 31 is a portion to which the piezoelectric drive element 6 is fixed (disposed). The main body portion 31 is located inside the opening 2b of the wiring substrate 2 when viewed in the Z-axis direction. The movable portion 32 is a portion on which the optical function unit 5 is disposed. The movable portion 32 is located on the other side in the Y-axis direction with respect to the main body portion 31.

The first extending portion 33 and the second extending portion 34 extend from the main body portion 31 such that the movable portion 32 is located therebetween. In the present embodiment, the movable portion 32 is located in the middle between the first extending portion 33 and the second extending portion 34. For example, the first extending portion 33 and the second extending portion 34 extend parallel to each other along the Y-axis direction. In the present embodiment, the first extending portion 33 has the same shape as that of the second extending portion 34. Incidentally, the first extending portion 33 and the second extending portion 34 may extend from the main body portion 31 such that at least a portion of the movable portion 32 is located between the first extending portion 33 and the second extending portion 34 (namely, such that the movable portion 32 is located between the first extending portion 33 and the second extending portion 34 in the X-axis direction).

The first coupling portion 35 extends along the X-axis direction between the first extending portion 33 and the movable portion 32. One end portion of the first coupling portion 35 is connected to the first extending portion 33, and the other end portion of the first coupling portion 35 is connected to the movable portion 32. Namely, the first coupling portion 35 couples the first extending portion 33 and the movable portion 32.

The second coupling portion 36 extends along the X-axis direction between the second extending portion 34 and the movable portion 32. One end portion of the second coupling portion 36 is connected to the second extending portion 34, and the other end portion of the second coupling portion 36 is connected to the movable portion 32. Namely, the second coupling portion 36 couples the second extending portion 34 and the movable portion 32.

In the present embodiment, the first coupling portion 35 and the second coupling portion 36 are located on a single straight line along the X-axis direction. From a positional relationship between the first extending portion 33 and the movable portion 32 and a positional relationship between the second extending portion 34 and the movable portion 32 described above, a length of the first coupling portion 35 in the X-axis direction is the same as a length of the second coupling portion 36 in the X-axis direction. In the present embodiment, the first coupling portion 35 has the same shape as that of the second coupling portion 36.

The movable portion 32, the first extending portion 33, the second extending portion 34, the first coupling portion 35, and the second coupling portion 36 are located inside the opening 2b of the wiring substrate 2 when viewed in the Z-axis direction. The first coupling portion 35 and the second coupling portion 36 function as torsion bars that elastically deform such that torsion bars twist according to deformation (displacement) of the first extending portion 33 and the second extending portion 34. The movable portion 32 oscillates around an axis along the X-axis direction according to elastic deformation of the first coupling portion 35 and the second coupling portion 36. Namely, the movable portion 32 is oscillatably supported by the first extending portion 33 and the second extending portion 34 via the first coupling portion 35 and via the second coupling portion 36.

The optical function unit 5 is disposed on a surface on an opposite side of the movable portion 32 from the opening 2b. The optical function unit 5 has, for example, a disk shape. The optical function unit 5 is attached to the movable portion 32 such that the optical surface 51 faces opposite the movable portion 32. The optical surface 51 is disposed in the middle between the first extending portion 33 and the second extending portion 34 in the X-axis direction. In the present embodiment, each of the metal substrate 3 and the optical surface 51 has a shape that is line symmetric with respect to a straight line passing through the center of the optical surface 51 along the Y-axis direction. As one example, the optical function unit 5 is made of glass or a semiconductor material such as silicon, and the optical surface 51 is formed of a reflective film formed on a surface on an opposite side of the optical function unit 5 from the movable portion 32. Namely, the optical surface 51 is a mirror surface (reflective surface). Incidentally, the reflective film of the optical function unit 5 can be omitted. In that case, the surface itself of the optical function unit 5 on the opposite side may be used as the optical surface 51.

The first connection portion 37 is connected to the first extending portion 33. The first connection portion 37 is located on the other side in the Y-axis direction with respect to the first extending portion 33. A portion on the other side of the first connection portion 37 in the Y-axis direction faces a portion of the wiring substrate 2. The first bonding member 4 is disposed between the portion on the other side of the first connection portion 37 and the portion of the wiring substrate 2. Incidentally, an electrode pad (not illustrated) electrically connected to the electrode pad 23 to have the same potential as that of the electrode pad 23 may be disposed on the portion of the wiring substrate 2.

The second connection portion 38 is connected to the second extending portion 34. The second connection portion 38 is located on the other side in the Y-axis direction with respect to the second extending portion 34. A portion on the other side of the second connection portion 38 in the Y-axis direction faces a portion of the wiring substrate 2. The first bonding member 4 is disposed between the portion on the other side of the second connection portion 38 and the portion of the wiring substrate 2. Incidentally, an electrode pad (not illustrated) electrically connected to the electrode pad 23 to have the same potential as that of the electrode pad 23 may be disposed on the portion of the wiring substrate 2. In the present embodiment, the first connection portion 37 and the second connection portion 38 are in a line symmetric relationship with respect to the straight line passing through the center of the optical surface 51 along the Y-axis direction.

The third connection portion 39 is connected to the main body portion 31. The third connection portion 39 is located on one side in the Y-axis direction with respect to the main body portion 31. A portion on one side of the third connection portion 39 in the Y-axis direction faces a portion of the wiring substrate 2 (portion on which the electrode pad 23 is disposed). The first bonding member 4 is disposed between the portion on the one side of the third connection portion 39 and the portion of the wiring substrate 2.

The piezoelectric drive element 6 is an element that generates plate waves in the metal substrate 3 to drive the actuator device 1. The piezoelectric drive element 6 is disposed on a placement surface 31a on an opposite side of the main body portion 31 from the opening 2b. The center of the piezoelectric drive element 6 in the X-axis direction is identical to the center of the movable portion 32 in the X-axis direction (namely, the center of the optical surface 51 in the X-axis direction). The piezoelectric drive element 6 includes a piezoelectric drive body 61, a first electrode 62, and a second electrode (not illustrated).

The piezoelectric drive body 61 includes a first main surface 61a and a second main surface (not illustrated). The first main surface 61a is a main surface on an opposite side of the piezoelectric drive body 61 from the placement surface 31a. The first electrode 62 is disposed on the first main surface 61a. The second main surface is a main surface on a placement surface 31a side of the piezoelectric drive body 61. The second electrode is disposed on the second main surface. Each of the first electrode 62 and the second electrode is, for example, a Ni/Au layer. In the Ni/Au layer, a Ni layer is disposed on the first main surface 61a, and a Au layer is disposed on the Ni layer. A thickness of the Ni layer is larger than a thickness of the Au layer. Each of the piezoelectric drive body 61, the first electrode 62, and the second electrode has, for example, a rectangular plate shape. The piezoelectric drive body 61 is electrically connected to the first electrode 62 by being joined to the first electrode 62. The piezoelectric drive body 61 is electrically connected to the second electrode by being joined to the second electrode. The second bonding member 8 is disposed between the second electrode and the main body portion 31. The second bonding member 8 bonds the piezoelectric drive body 61 and the metal substrate 3. The second bonding member 8 has conductivity. Examples of the material of the second bonding member 8 include an epoxy resin containing Ag particles.

The piezoelectric detection element 7 is an element that detects an operation amount of the movable portion 32. In the present embodiment, the piezoelectric detection element 7 detects an oscillation angle and a phase of the movable portion 32. The piezoelectric detection element 7 is disposed on a surface 62a. The surface 62a is a main surface on an opposite side of the first electrode 62 from the piezoelectric drive body 61. The center of the piezoelectric detection element 7 in the X-axis direction is identical to the center of the piezoelectric drive element 6 in the X-axis direction. The piezoelectric detection element 7 includes a piezoelectric detection body 71, a third electrode 72, and a fourth electrode (not illustrated). The piezoelectric detection body 71 includes a third main surface 71a and a fourth main surface (not illustrated). The third main surface 71a is a main surface on an opposite side of the piezoelectric detection body 71 from the first electrode 62. The third electrode 72 is disposed on the third main surface 71a. The fourth main surface is a main surface on a first electrode 62 side of the piezoelectric detection body 71. The fourth electrode is disposed on the fourth main surface. Each of the third electrode 72 and the fourth electrode is, for example, a Ni/Au layer. Each of the piezoelectric detection body 71, the third electrode 72, and the fourth electrode has, for example, a rectangular plate shape. The piezoelectric detection body 71 is electrically connected to the third electrode 72 by being joined to the third electrode 72. The piezoelectric detection body 71 is electrically connected to the fourth electrode by being joined to the fourth electrode. The second bonding member 8 is disposed between the fourth electrode and the first electrode 62. The second bonding member 8 bonds the piezoelectric detection body 71 and the piezoelectric drive body 61.

Here, an electrical connection relationship between the wiring substrate 2, the metal substrate 3, the piezoelectric drive element 6, and the piezoelectric detection element 7 will be described. As illustrated in FIG. 2, the first electrode 62 of the piezoelectric drive element 6 is electrically connected to the electrode pad 21 via a wire 11. The electrode pad 21 is electrically connected to a terminal 25 of the connector 24 via a wiring of the wiring substrate 2. Namely, the first electrode 62 of the piezoelectric drive element 6 is electrically connected to the connector 24 via the wire 11, the electrode pad 21, and the wiring of the wiring substrate 2.

The second electrode of the piezoelectric drive element 6 is electrically connected to the metal substrate 3 via the second bonding member 8 disposed between the second electrode and the main body portion 31. The third connection portion 39 of the metal substrate 3 is electrically connected to the electrode pad 23 via the first bonding member 4 disposed between the third connection portion 39 and the electrode pad 23. The electrode pad 23 is electrically connected to a terminal 25 of the connector 24 via a wiring of the wiring substrate 2. Namely, the second electrode of the piezoelectric drive element 6 is electrically connected to the connector 24 via the second bonding member 8, the metal substrate 3, the first bonding member 4, the electrode pad 23, and the wiring of the wiring substrate 2.

The third electrode 72 of the piezoelectric detection body 71 is electrically connected to the electrode pad 22 via a wire 12. The electrode pad 22 is electrically connected to a terminal 25 of the connector 24 via a wiring of the wiring substrate 2. Namely, the third electrode 72 of the piezoelectric detection body 71 is electrically connected to the connector 24 via the wire 12, the electrode pad 22, and the wiring of the wiring substrate 2.

The fourth electrode of the piezoelectric detection element 7 is electrically connected to the first electrode 62 of the piezoelectric drive element 6 via the second bonding member 8 disposed between the fourth electrode and the first electrode 62 of the piezoelectric drive element 6. Namely, the fourth electrode of the piezoelectric detection element 7 is electrically connected to the connector 24 via the second bonding member 8, the first electrode 62 of the piezoelectric drive element 6, the wire 11, the electrode pad 21, and the wiring of the wiring substrate 2.

The actuator device 1 is driven, for example, as follows according to the above-described electrical connection relationship. Specifically, in a state where the first electrode 62 of the piezoelectric drive element 6 and the fourth electrode of the piezoelectric detection element 7 are connected to a reference potential (for example, a ground potential) via the wire 11, the electrode pad 21, the wiring of the wiring substrate 2, and the connector 24, a drive voltage signal is input to the second electrode of the piezoelectric drive element 6 from the outside of the actuator device 1 via the connector 24, the wiring of the wiring substrate 2, the electrode pad 23, the first bonding member 4, the metal substrate 3, and the second bonding member 8. Accordingly, the piezoelectric drive element 6 deforms and/or vibrates to generate periodic plate waves in the main body portion 31. Because of the generation of the periodic plate waves, torsional vibration (torsional resonance) is induced in the first coupling portion 35 and in the second coupling portion 36, and the movable portion 32 and the optical surface 51 oscillate. Namely, in the actuator device 1, while a torsional resonance system formed of the first coupling portion 35, the second coupling portion 36, the movable portion 32, and the optical surface 51 and the piezoelectric drive element 6 are disposed at separate positions, a Lamb wave resonance system is adopted, so that torsional resonance is generated with high driving efficiency. On the other hand, a voltage signal corresponding to a change in angle caused by the oscillation of the movable portion 32 and the optical surface 51 is output from the third electrode 72 of the piezoelectric detection body 71 to the outside of the actuator device 1 via the wire 12, the electrode pad 22, the wiring of the wiring substrate 2, and the connector 24, and an oscillation angle and a phase of the optical surface 51 are detected. Incidentally, the actuator device 1 includes a piezoelectric unit 10. The piezoelectric unit 10 includes the metal substrate 3, the piezoelectric drive element 6, the piezoelectric detection element 7, and the second bonding member 8 described above.

[Configuration of Wiring Substrate, Metal Substrate, and First Bonding Member]

Figure 3:
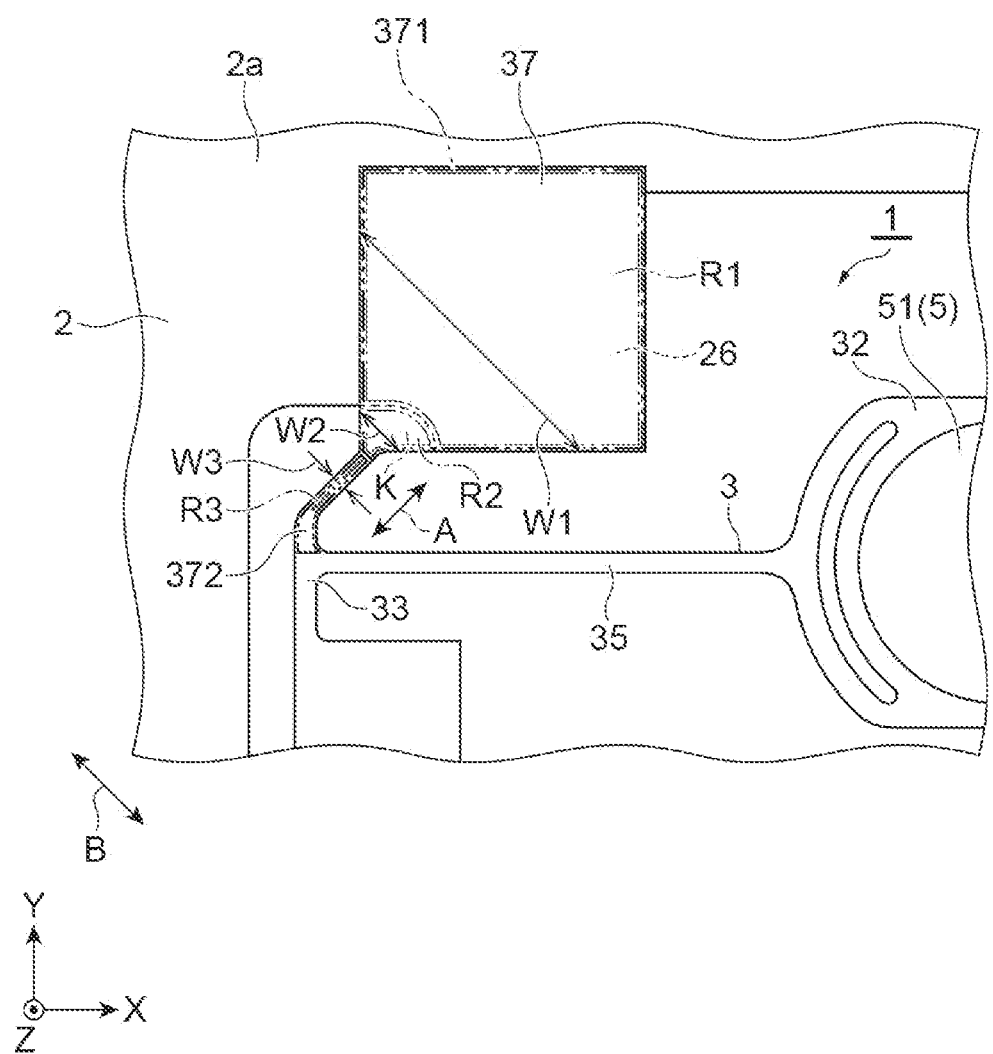
FIG. 3 is a plan view of a portion of a wiring substrate and a metal substrate illustrated in FIG. 1.

As illustrated in FIG. 3, the first connection portion 37 includes a first region R1, a second region R2, and a third region R3. The first region R1 is a region facing a portion 26 in the Z-axis direction. The portion 26 is a portion of the wiring substrate 2. The second region R2 is a region that is continuous from the first region R1. The third region R3 is a region that is continuous from the second region R2 and that is connected to the first extending portion 33. The "region connected to the first extending portion 33" includes both a region where the third region R3 is directly connected to the first extending portion 33 (namely, without passing through another portion) and a region where the third region R3 is indirectly connected to the first extending portion 33 (namely, via another portion). Namely, the third region R3 is not limited to an entire portion between the first extending portion 33 and the second region R2 in the first connection portion 37, and is a region that is continuously connected to the second region R2. In the present embodiment, the second region R2 and the third region R3 do not face the wiring substrate 2 in the Z-axis direction.

In the following description, when viewed in the Z-axis direction, a direction in which the third region R3 is connected to the second region R2 is referred to as a connection direction A, and a direction perpendicular to the connection direction A is referred to as a direction B. In the present embodiment, the connection direction A intersects each of the X-axis direction and the Y-axis direction when viewed in the Z-axis direction. In the present embodiment, when viewed in the Z-axis direction, a region including the first region R1 and the second region R2 has a polygonal shape, and the second region R2 forms one corner K of the polygonal shape. As one example, when viewed in the Z-axis direction, the region including the first region R1 and the second region R2 has a substantially rectangular shape, and a boundary line between the first region R1 and the second region R2 is curved to protrude opposite a vertex of the corner K. When viewed in the Z-axis direction, the second region R2 has, for example, a fan shape. As one example, when viewed in the Z-axis direction, the third region R3 has an oblong shape having the connection direction A as a longitudinal direction, and is connected to a portion located farthest to one side in the X-axis direction and farthest to one side in the Y-axis direction in the second region R2.

When viewed in the Z-axis direction, a width W2 of the second region R2 in the direction B is larger than a width W3 of the third region R3 in the direction B. "When viewed in the Z-axis direction, the width W2 of the second region R2 in the direction B is larger than the width W3 of the third region R3 in the direction B" means that when viewed in the Z-axis direction, a minimum value of the width W2 of the second region R2 in the direction B is larger than a maximum value of the width W3 of the third region R3 in the direction B except for a boundary portion between the second region R2 and the third region R3.

Incidentally, with respect to the first region R1 facing the portion 26 of the wiring substrate 2 in the Z-axis direction, the second region R2 includes i) a region that does not face the wiring substrate 2 in the Z-axis direction, or ii) a region where a distance to the wiring substrate 2 in the Z-axis direction is larger than a distance between the first region R1 and the wiring substrate 2 in the Z-axis direction. In the present embodiment, the second region R2 is i) the region that does not face the wiring substrate 2 in the Z-axis direction.

In addition, a boundary between the second region R2 and the third region R3 includes i) a "line along the direction B" when the width of the first connection portion 37 in the direction B changes discontinuously beyond the "line along the direction B" as a boundary, ii) a "line along the direction B" when the rate of change in the width of the first connection portion 37 in the direction B changes discontinuously beyond the "line along the direction B" as a boundary, or iii) a "line along the direction B" when the width of the first connection portion 37 in the direction B is more than 1.1 times a minimum value of the width of the first connection portion 37 in the direction B beyond the "line along the direction B" as a boundary. In the present embodiment, the boundary between the second region R2 and the third region R3 is iii) the "line along the direction B" when the width of the first connection portion 37 in the direction B is more than 1.1 times the minimum value of the width of the first connection portion 37 in the direction B beyond the "line along the direction B" as a boundary. Incidentally, the third region R3 is a region including at least a portion of the first connection portion 37, the portion having a minimum width of the first connection portion 37 in the direction B, and a second portion (details will be described later) of the first bonding member 4 does not exceed at least a line where the width of the first connection portion 37 in the direction B is at its minimum.

When viewed in the Z-axis direction, a width W1 of the first region R1 in the direction B is larger than the width W2 of the second region R2 in the direction B. "When viewed in the Z-axis direction, the width W1 of the first region R1 in the direction B is larger than the width W2 of the second region R2 in the direction B" means that when viewed in the Z-axis direction, a maximum value of the width W1 of the first region R1 in the direction B is larger than a maximum value of the width W2 of the second region R2 in the direction B. In such a manner, when viewed in the Z-axis direction, the width of the first connection portion 37 in the direction B gradually increases from the third region R3 toward the first region R1.

In the present embodiment, when viewed in the Z-axis direction, an area of the first region R1 is larger than an area of the second region R2, and the area of the second region R2 is larger than an area of the third region R3. Further, when viewed in the Z-axis direction, the area of the first region R1 is larger than the sum of the area of the second region R2 and the area of the third region R3. The rigidity of the second region R2 is greater than the rigidity of the third region R3. The rigidity of the first region R1 is greater than the rigidity of the second region R2.

The first bonding member 4 (refer to FIG. 2 and the like) bonds the portion 26 of the wiring substrate 2 and the first connection portion 37. The first bonding member 4 includes a first portion (not illustrated) and the second portion (not illustrated). The first portion is a portion of the first bonding member 4 which is disposed between the portion 26 and the first region R1. The second portion is a portion of the first bonding member 4 which is continuous from the first portion and which reaches the second region R2 but does not reach the third region R3. Namely, the second portion is in contact with the second region R2 but is not in contact with the third region R3. As one example, the second portion is in contact with the second region R2 and with a side surface of the portion 26, and a surface on an opposite side of the second portion from the second region R2 is exposed to a space. Namely, the first bonding member 4 is in contact with each of the first region R1 and the second region R2 but is not in contact with the third region R3. In the first connection portion 37, the second region R2 is provided between the first region R1 and the third region R3 in such a manner, so that in the metal substrate 3, the first bonding member 4 protruding from the first region R1 stays in the second region R2, and the first bonding member 4 is not in contact with the third region R3 connected to the first extending portion 33.

Figure 4:
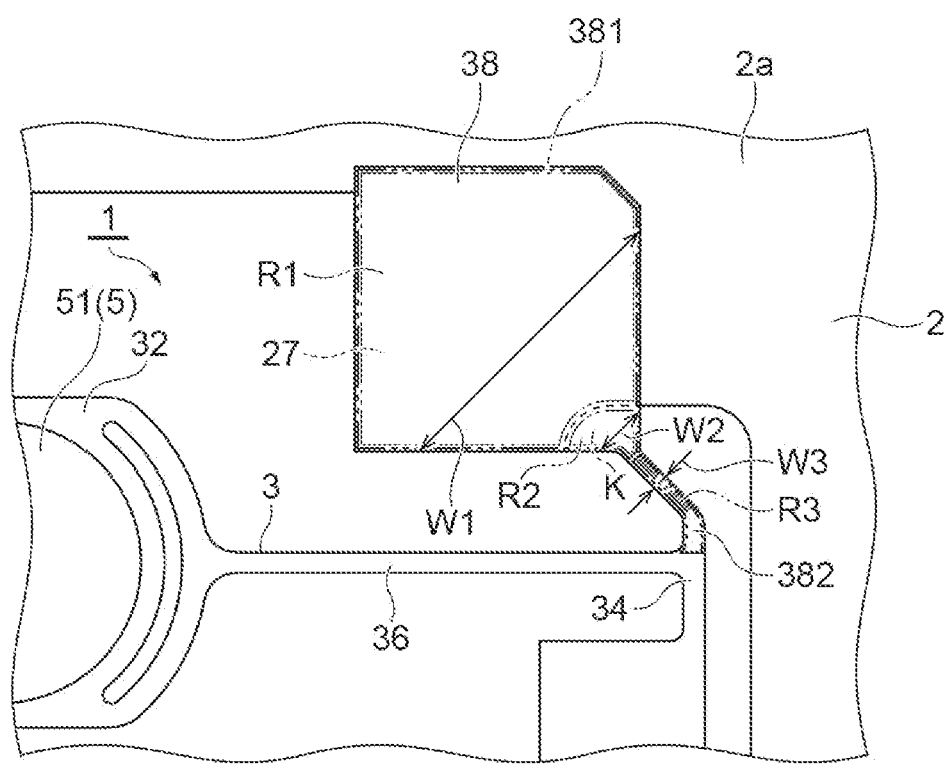
FIG. 4 is a plan view of a portion of the wiring substrate and the metal substrate illustrated in FIG. 1.
Figure 4:
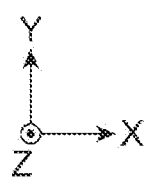

As illustrated in FIG. 4, similarly to the first connection portion 37, the second connection portion 38 also includes the first region R1, the second region R2, and the third region R3. The first region R1 of the second connection portion 38 is a region facing a portion 27 in the Z-axis direction, the portion 27 being a portion of the wiring substrate 2. The second region R2 of the second connection portion 38 is a region that is continuous from the first region R1. The third region R3 of the second connection portion 38 is a region that is continuous from the second region R2 and that is connected to the second extending portion 34. The first bonding member 4 (refer to FIG. 2 and the like) bonds the portion 27 of the wiring substrate 2 and the second connection portion 38. Similarly to the first bonding member 4 that bonds the portion 26 and the first connection portion 37, the first bonding member 4 that bonds the portion 27 of the wiring substrate 2 and the second connection portion 38 also includes a first portion (not illustrated) and a second portion (not illustrated). The configuration of the second connection portion 38 and the first bonding member 4 is the same as the configuration of the first connection portion 37 and the first bonding member 4 (are in a line symmetric relationship with respect to the straight line passing through the center of the optical surface 51 along the Y-axis direction).

Figure 5:
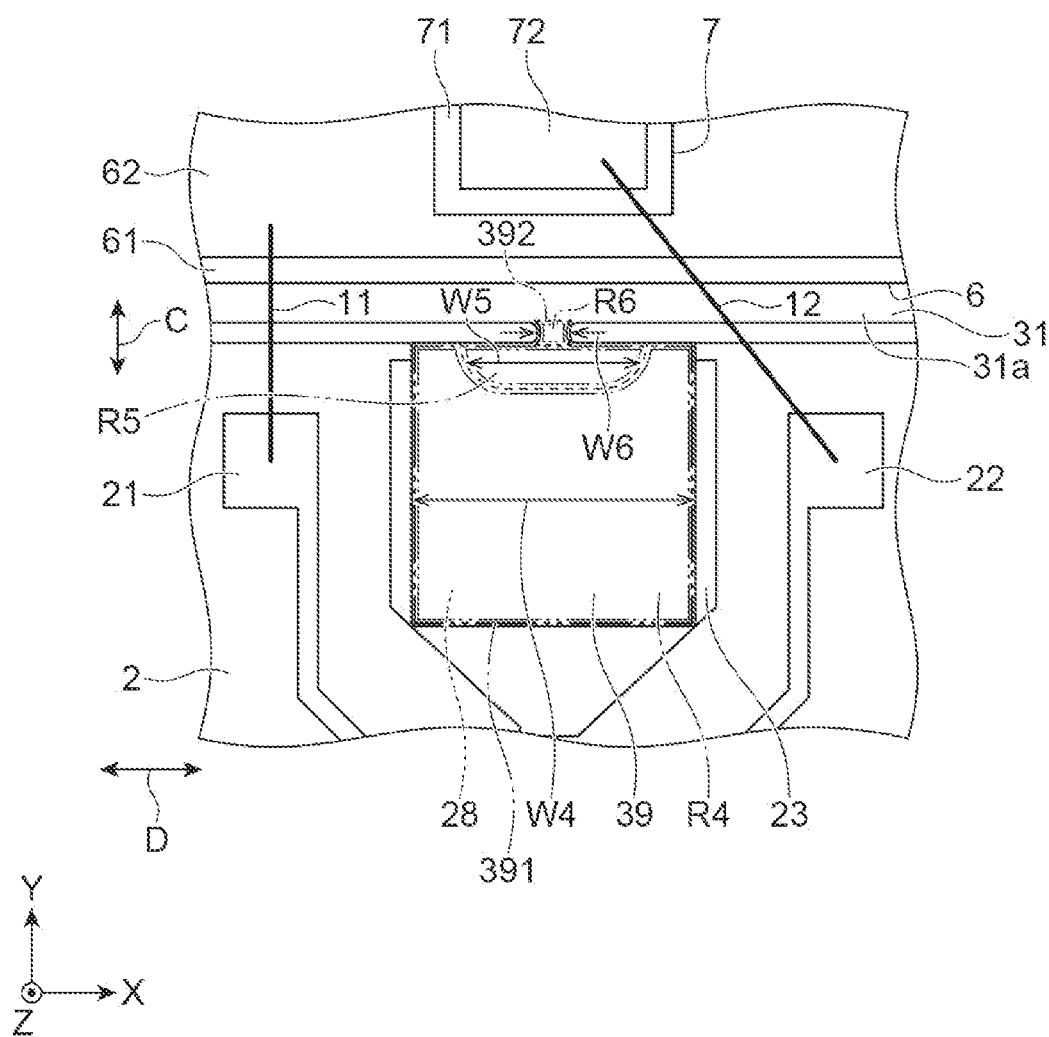
FIG. 5 is a plan view of a portion of the wiring substrate and the metal substrate illustrated in FIG. 1.

As illustrated in FIG. 5, the third connection portion 39 includes a fourth region R4, a fifth region R5, and a sixth region R6. The fourth region R4 is a region facing a portion 28 in the Z-axis direction. The portion 28 is another portion of the wiring substrate 2 other than the portion 26. The fifth region R5 is a region that is continuous from the fourth region R4. The sixth region R6 is a region that is continuous from the fifth region R5 and that is connected to the main body portion 31. The "region connected to the main body portion 31" includes both a region where the sixth region R6 is directly connected to the main body portion 31 (namely, without passing through another portion) and a region where the sixth region R6 is indirectly connected to the main body portion 31 (namely, via another portion). Namely, the sixth region R6 is not limited to an entire portion between the main body portion 31 and the fifth region R5 in the third connection portion 39, and is a region that is continuously connected to the fifth region R5.

In the following description, when viewed in the Z-axis direction, a direction in which the sixth region R6 is connected to the fifth region R5 (another connection direction) is referred to as a connection direction C, and a direction perpendicular to the connection direction C is referred to as a direction D. In the present embodiment, when viewed in the Z-axis direction, a region including the fourth region R4 and the fifth region R5 has a polygonal shape, and the fifth region R5 forms a part of one side portion of the polygonal shape. As one example, when viewed in the Z-axis direction, the region including the fourth region R4 and the fifth region R5 has a rectangular shape, and a boundary line between the fourth region R4 and the fifth region R5 is curved to protrude opposite the above side portion. When viewed in the Z-axis direction, the fifth region R5 has, for example, a semi-elliptical shape. When viewed in the Z-axis direction, the sixth region R6 has, for example, a substantially rectangular shape and is connected to a portion located at the center in the X-axis direction and farthest to the other side in the Y-axis direction in the fifth region R5.

When viewed in the Z-axis direction, a width W5 of the fifth region R5 in the direction D is larger than a width W6 of the sixth region R6 in the direction D. "When viewed in the Z-axis direction, the width W5 of the fifth region R5 in the direction D is larger than the width W6 of the sixth region R6 in the direction D" means that when viewed in the Z-axis direction, a minimum value of the width W5 of the fifth region R5 in the direction D is larger than a maximum value of the width W6 of the sixth region R6 in the direction D except for a boundary portion between the fifth region R5 and the sixth region R6.

Incidentally, with respect to the fourth region R4 facing the portion 28 of the wiring substrate 2 in the Z-axis direction, the fifth region R5 includes i) a region that does not face the wiring substrate 2 in the Z-axis direction, or ii) a region where a distance to the wiring substrate 2 in the Z-axis direction is larger than a distance between the fourth region R4 and the wiring substrate 2 in the Z-axis direction. In the present embodiment, the fifth region R5 is i) the region that does not face the wiring substrate 2 in the Z-axis direction.

In addition, a boundary between the fifth region R5 and the sixth region R6 includes i) a "line along the direction D" when the width of the third connection portion 39 in the direction D changes discontinuously beyond the "line along the direction D" as a boundary, ii) a "line along the direction D" when the rate of change in the width of the third connection portion 39 in the direction D changes discontinuously beyond the "line along the direction D" as a boundary, or iii) a "line along the direction D" when the width of the third connection portion 39 in the direction D is more than 1.1 times a minimum value of the width of the third connection portion 39 in the direction D beyond the "line along the direction D" as a boundary. In the present embodiment, the boundary between the fifth region R5 and the sixth region R6 is iii) the "line along the direction D" when the width of the third connection portion 39 in the direction D is more than 1.1 times the minimum value of the width of the third connection portion 39 in the direction D beyond the "line along the direction D" as a boundary. Incidentally, the sixth region R6 is a region including at least a portion of the third connection portion 39, the portion having a minimum width of the third connection portion 39 in the direction D, and a fourth portion (details will be described later) of the first bonding member 4 does not exceed at least a line where the width of the third connection portion 39 in the direction D is at its minimum.

When viewed in the Z-axis direction, a width W4 of a portion of the fourth region R4 in the direction D is larger than the width W5 of the fifth region R5 in the direction D, the portion being located on one side of the fifth region R5 in the Y-axis direction. "When viewed in the Z-axis direction, the width W4 of a portion of the fourth region R4 in the direction D is larger than the width W5 of the fifth region R5 in the direction D, the portion being located on one side of the fifth region R5 in the Y-axis direction" means that when viewed in the Z-axis direction, a maximum value of the width W4 in the direction D is larger than a maximum value of the width W5 of the fifth region R5 in the direction D. In such a manner, when viewed in the Z-axis direction, the width of the third connection portion 39 in the direction D gradually increases from the sixth region R6 toward the fourth region R4.

In the present embodiment, when viewed in the Z-axis direction, an area of the fourth region R4 is larger than an area of the fifth region R5. Further, when viewed in the Z-axis direction, the area of the fourth region R4 is larger than the sum of the area of the fifth region R5 and an area of the sixth region R6. The rigidity of the fifth region R5 is greater than the rigidity of the sixth region R6. The rigidity of the fourth region R4 is greater than the rigidity of the fifth region R5.

In the present embodiment, the fifth region R5 and the sixth region R6 do not face the wiring substrate 2 in the Z-axis direction. The first bonding member 4 bonds the portion 28 (another portion) of the wiring substrate 2 and the third connection portion 39. The first bonding member 4 (refer to FIG. 2 and the like) includes a third portion (not illustrated) and the fourth portion (not illustrated). The third portion is a portion of the first bonding member 4 which is disposed between the portion 28 and the fourth region R4. The fourth portion is a portion of the first bonding member 4 which is continuous from the third portion and which reaches the fifth region R5 but does not reach the sixth region R6. Namely, the fourth portion is in contact with the fifth region R5 but is not in contact with the sixth region R6. As one example, the fourth portion is in contact with the fifth region R5 and with a side surface of the portion 28, and a surface on an opposite side of the fourth portion from the fifth region R5 is exposed to a space. Namely, the first bonding member 4 is in contact with each of the fourth region R4 and the fifth region R5 but is not in contact with the sixth region R6. In the third connection portion 39, the fifth region R5 is provided between the fourth region R4 and the sixth region R6 in such a manner, so that in the metal substrate 3, the first bonding member 4 protruding from the fourth region R4 stays in the fifth region R5, and the first bonding member 4 is not in contact with the sixth region R6 connected to the main body portion 31.

[Configuration of Each Connection Portion]

Figure 6:
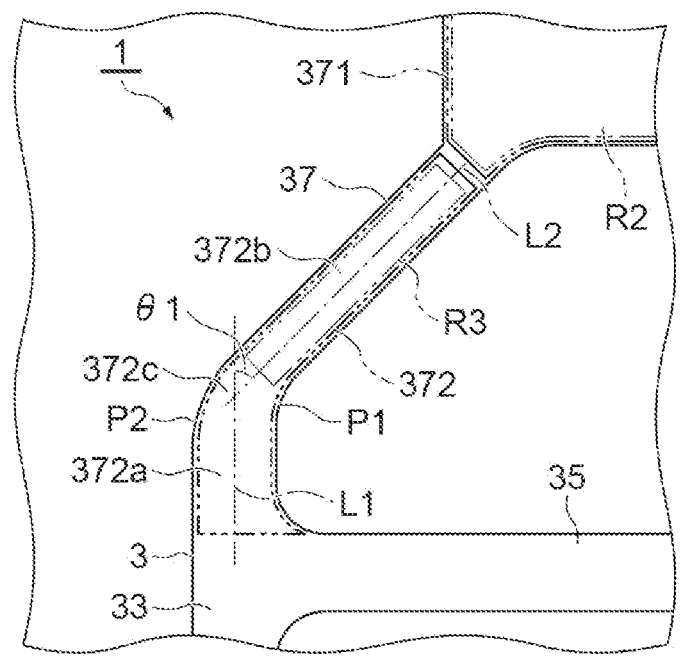
FIG. 6 is a plan view of a portion of the metal substrate illustrated in FIG. 1.
Figure 6:
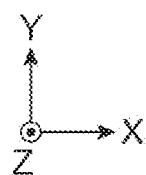

As illustrated in FIGS. 3 and 6, the first connection portion 37 further includes a first fixing region 371 and a first connection region 372. The first fixing region 371 is fixed to the wiring substrate 2. In the present embodiment, at least a part of the first fixing region 371 is fixed to the wiring substrate 2. Specifically, the first fixing region 371 includes the first region R1 that faces the portion 26 of the wiring substrate 2 and that is fixed to the portion 26 by the first bonding member 4 (refer to FIG. 2 and the like), and the second region R2 that does not face the wiring substrate 2 and that is fixed to the portion 26 by the first bonding member 4 reaching the second region R2. Incidentally, the first fixing region 371 may further include a portion that does not face a portion of the wiring substrate 2 and that is not fixed to the wiring substrate 2.

The first connection region 372 is a region connected to the first extending portion 33 and to the first fixing region 371. An entire boundary between the first connection region 372 and the first fixing region 371 is formed on a movable portion 32 side in the X-axis direction with respect to a location of connection between the first connection region 372 and the first extending portion 33. The first connection region 372 includes the third region R3. As illustrated in FIG. 6, the first connection region 372 includes a portion (first portion) 372a, a portion (third portion) 372b, and a first bent portion 372c. The portion 372a is a portion extending linearly from the first extending portion 33. The portion 372a is located farthest to one side in the Y-axis direction in the first connection region 372. In the present embodiment, the portion 372a extends along the Y-axis direction.

The portion 372b is a portion having a positional relationship in which the portion 372b intersects the portion 372a, and extending linearly from the first fixing region 371. The positional relationship in which the portion 372b intersects the portion 372a means, for example, that the portion 372a and the portion 372b are located such that a direction along a center line L2 of the portion 372*b* intersects a direction along a center line L1 of the portion 372*a*. Namely, the center line L1 of the portion 372*a* is not parallel to the center line L2 of the portion 372*b*. The portion 372*b* is located farthest to the other side in the Y-axis direction in the first connection region 372. In the present embodiment, the portion 372*b* extends along a direction intersecting each of the X-axis direction and the Y-axis direction.

The first bent portion 372*c* is bent toward the movable portion 32 side in the first connection region 372. In the present embodiment, the first bent portion 372*c* is a portion connected to the portion 372*a* and to the portion 372*b*. Namely, the first bent portion 372*c* is located between the portion 372*a* and the portion 372*b*. The first bent portion 372*c* has a first outer edge P1 on the movable portion 32 side, and a second outer edge P2 opposite the movable portion 32. Each of the first outer edge P1 and the second outer edge P2 is bent toward the movable portion 32 side when viewed in the Z-axis direction. Namely, the first connection region 372 is bent at the first bent portion 372*c*. In the present embodiment, when viewed in the Z-axis direction, each of the first outer edge P1 and the second outer edge P2 is curved to protrude opposite the movable portion 32.

When viewed in the Z-axis direction, an angle $\theta 1$ formed by the portion 372*b* with respect to the Y-axis direction is larger than 0 degrees and 90 degrees or less. The angle $\theta 1$ formed by the portion 372*b* with respect to the Y-axis direction is, for example, an angle formed by the center line L2 of the portion 372*b* with respect to the Y-axis direction. Namely, the angle $\theta 1$ is an angle indicating an inclination of the portion 372*b* toward the movable portion 32 side with respect to the Y-axis direction. As one example, the angle $\theta 1$ is approximately 45 degrees.

Figure 7:
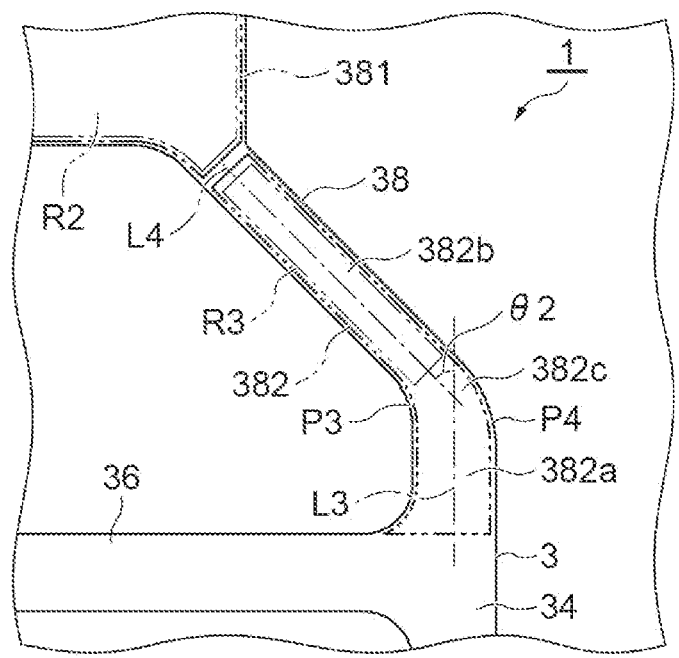
FIG. 7 is a plan view of a portion of the metal substrate illustrated in FIG. 1.

As illustrated in FIGS. 4 and 7, the second connection portion 38 further includes a second fixing region 381 and a second connection region 382. Similarly to the first fixing region 371, the second fixing region 381 is fixed to the wiring substrate 2. In the present embodiment, at least a part of the second fixing region 381 is fixed to the wiring substrate 2. Specifically, similarly to the first fixing region 371, the second fixing region 381 includes the first region R1 that faces the portion 27 of the wiring substrate 2 and that is fixed to the portion 27 by the first bonding member 4 (refer to FIG. 2 and the like), and the second region R2 that does not face the wiring substrate 2 and that is fixed to the portion 27 by the first bonding member 4 reaching the second region R2. Incidentally, the second fixing region 381 may further include a portion that does not face a portion of the wiring substrate 2 and that is not fixed to the wiring substrate 2.

Similarly to the first connection region 372, the second connection region 382 is a region connected to the second extending portion 34 and to the second fixing region 381. An entire boundary between the second connection region 382 and the second fixing region 381 is formed on the movable portion 32 side in the X-axis direction with respect to a location of connection between the second connection region 382 and the second extending portion 34. Similarly to the first connection region 372, the second connection region 382 includes the third region R3. As illustrated in FIG. 7, the second connection region 382 includes a portion (second portion) 382*a*, a portion (fourth portion) 382*b*, and a second bent portion 382*c*. The portion 382*a* is a portion extending linearly from the second extending portion 34. The portion 382*a* is located farthest to one side in the Y-axis direction in the second connection region 382. In the present embodiment, the portion 382*a* extends along the Y-axis direction.

The portion 382*b* is a portion having a positional relationship in which the portion 382*b* intersects the portion 382*a*, and extending linearly from the second fixing region 381. Namely, a center line L3 of the portion 382*a* is not parallel to a center line L4 of the portion 382*b*. The portion 382*b* is located farthest to the other side in the Y-axis direction in the second connection region 382. In the present embodiment, the portion 382*b* extends along a direction intersecting each of the X-axis direction and the Y-axis direction.

The second bent portion 382*c* is bent toward the movable portion 32 side in the second connection region 382. In the present embodiment, the second bent portion 382*c* is a portion connected to the portion 382*a* and to the portion 382*b*. The second bent portion 382*c* has a third outer edge P3 on the movable portion 32 side, and a fourth outer edge P4 opposite the movable portion 32. Each of the third outer edge P3 and the fourth outer edge P4 is bent toward the movable portion 32 side when viewed in the Z-axis direction. Namely, the second connection region 382 is bent at the second bent portion 382*c*. In the present embodiment, when viewed in the Z-axis direction, each of the third outer edge P3 and the fourth outer edge P4 is curved to protrude opposite the movable portion 32.

When viewed in the Z-axis direction, an angle $\theta 2$ formed by the portion 382*b* with respect to the Y-axis direction is larger than 0 degrees and 90 degrees or less and is, for example, approximately 45 degrees. As described above, the configuration of the second fixing region 381 and the second connection region 382 is the same as the configuration of the first fixing region 371 and the first connection region 372 (are in a line symmetric relationship with respect to the straight line passing through the center of the optical surface 51 along the Y-axis direction).

As illustrated in FIG. 2, the first fixing region 371 and the second fixing region 381 are separated from each other with a region Rh interposed therebetween. The region Rh is located opposite the main body portion 31 with respect to the movable portion 32 in the Y-axis direction. In the present embodiment, the region Rh is a space. Namely, in the present embodiment, the first fixing region 371 and the second fixing region 381 are separated from each other via a space. Incidentally, the region Rh may include an object other than the space.

As illustrated in FIG. 5, the third connection portion 39 further includes a third fixing region 391 and a third connection portion 392. The third fixing region 391 is a region fixed to the wiring substrate 2. In the present embodiment, at least a part of the third fixing region 391 is fixed to the wiring substrate 2. Specifically, the third fixing region 391 includes the fourth region R4 that faces the portion 28 of the wiring substrate 2 and that is fixed to the portion 28 by the first bonding member 4 (refer to FIG. 2 and the like), and the fifth region R5 that does not face the wiring substrate 2 and that is fixed to the portion 28 by the first bonding member 4 reaching the fifth region R5. The third connection portion 392 is a region connected to the main body portion 31 and to the third fixing region 391. The third connection portion 392 includes the sixth region R6. Incidentally, the third fixing region 391 may further include a portion that does not face a portion of the wiring substrate 2 and that is not fixed to the wiring substrate 2. As one example, the third connection portion 392 extends linearly from the main body portion 31 along the Y-axis direction.

Actions and Effects

In the actuator device 1, even when the wiring substrate 2 expands or contracts, for example, because of a change in environmental temperature, since the first bent portion 372c in the first connection region 372 deforms and the second bent portion 382c in the second connection region 382 deforms, unwanted stress is unlikely to act on the first coupling portion 35, the second coupling portion 36, and the main body portion 31 via the first fixing region 371 and the second fixing region 381 that are fixed to the wiring substrate 2, and unwanted stress is unlikely to act on the main body portion 31 via the third fixing region 391 fixed to the wiring substrate 2, so that a change in the resonant frequency of the metal substrate 3 is suppressed. Therefore, according to the actuator device 1, for example, even when the environmental temperature changes, it is possible to stably obtain a desired driving characteristic.

Effects of the actuator device 1 will be further described. In the actuator device 1, when the wiring substrate 2 expands or contracts, for example, because of a change in environmental temperature, the first fixing region 371 moves along a direction that is inclined opposite the movable portion 32 with respect to the Y-axis direction, and the second fixing region 381 moves along a direction that is inclined opposite the movable portion 32 with respect to the Y-axis direction. As one example, when the wiring substrate 2 expands, the first fixing region 371 moves outward along the above direction, and the second fixing region 381 moves outward along the above direction. In the actuator device 1, if the connection regions 372 and 382 extend linearly from the extending portions 33 and 34 to the fixing regions 371 and 381 along the Y-axis direction without including the bent portions 372c and 382c, respectively, the following problem can occur. Namely, since the above configuration does not include portions at which each of the connection regions 372 and 382 deforms when the wiring substrate 2 expands or contracts for example, because of a change in environmental temperature, unwanted stress acts on the first coupling portion 35, the second coupling portion 36, and the main body portion 31 via each of the fixing regions 371 and 381, and as a result, the resonant frequency of the metal substrate 3 is changed.

In addition, when viewed in the Z-axis direction, if each of the first outer edge P1 and the second outer edge P2 in the first connection region 372 is bent opposite the movable portion 32, the portion 372b is inclined opposite the movable portion 32 with respect to the Y-axis direction, each of the third outer edge P3 and the fourth outer edge P4 in the second connection region 382 is bent opposite the movable portion 32, and the portion 372b is inclined opposite the movable portion 32 with respect to the Y-axis direction, the following problem can occur. Namely, in the above configuration, when the wiring substrate 2 expands or contracts, for example, because of a change in environmental temperature, since a direction in which the portion 372b extends and a direction in which the first fixing region 371 moves are close to being parallel, and a direction in which the portion 382b extends and a direction in which the second fixing region 381 moves are close to being parallel, each of the bent portions 372c and 382c is unlikely to deform. As a result, unwanted stress acts on the first coupling portion 35, the second coupling portion 36, and the main body portion 31 via each of the fixing regions 371, 381, and 391, and the resonant frequency of the metal substrate 3 is changed.

In addition, a drive voltage to obtain a desired oscillation angle of the movable portion 32 is affected by a ratio between a resonant frequency in a resonant mode of the entirety of the metal substrate 3 (hereinafter, referred to as a "leaf spring resonant mode") and a resonant frequency in a resonant mode of the movable portion 32. For this reason, for example, in the above configuration, in a case where the wiring substrate 2 expands or contracts because of a change in environmental temperature, when unwanted stress acts on the first coupling portion 35, the second coupling portion 36, and the main body portion 31 via each of the fixing regions 371 and 381, and the resonant frequency in the leaf spring resonant mode is changed, the ratio between the resonant frequency in the leaf spring resonant mode and the resonant frequency in the resonant mode of the movable portion is changed, and a desired driving characteristic cannot be obtained, which is a concern.

In contrast, in the actuator device 1, since the first connection region 372 includes the first bent portion 372c and the second connection region 382 includes the second bent portion 382c, when each of the fixing regions 371 and 381 is moved by deformation of the wiring substrate 2, it is possible to cause stress to be concentratedly generated in each of the bent portions 372c and 382c. The reason is that tensile stress or compressive stress acting on the metal substrate 3 via each of the fixing regions 371 and 381 can be converted into bending stress acting on each of the bent portions 372c and 382c. Namely, stress acting on the metal substrate 3 caused by deformation of the wiring substrate 2 is absorbed by the first connection region 372 and the second connection region 382 that are unlikely to affect a change in the resonant frequency of the metal substrate 3, so that it is possible to suppress the action of stress on the first coupling portion 35, the second coupling portion 36, and the main body portion 31 that are likely to affect a change in the resonant frequency of the metal substrate 3.

Incidentally, in an example where the connection regions 372 and 382 do not include the bent portions 372c and 382c, respectively, the first bent portion that is bent toward the movable portion 32 side from the first extending portion 33 is provided on a main body portion 31 side (one side in the Y-axis direction) of a connection portion between the first extending portion 33 and the first coupling portion 35, and the second bent portion that is bent toward the movable portion 32 side from the second extending portion 34 is provided on the main body portion 31 side (one side in the Y-axis direction) of a connection portion between the second extending portion 34 and the second coupling portion 36, the following problem can occur. Namely, in the above configuration, the connection portion between the first extending portion 33 and the first coupling portion 35 is located on a first fixing region 371 side of the first bent portion, and the connection portion between the second extending portion 34 and the second coupling portion 36 is located on a second fixing region 381 side of the second bent portion. For this reason, when the wiring substrate 2 expands or contracts, for example, because of a change in environmental temperature, unwanted stress is likely to act on the connection portion between the first extending portion 33 and the first coupling portion 35 and on the connection portion between the second extending portion 34 and the second coupling portion 36, and as a result, the resonant frequency of the metal substrate 3 is greatly changed.

In contrast, in the actuator device 1, the first bent portion 372c is provided in the first connection region 372 that is located opposite the main body portion 31 (the other side in the Y-axis direction) with respect to the connection portion between the first extending portion 33 and the first coupling portion 35, and the second bent portion 382c is provided in the second connection region 382 that is located opposite the main body portion 31 (the other side in the Y-axis direction) with respect to the connection portion between the second extending portion 34 and the second coupling portion 36. Accordingly, it is possible to suppress a large fluctuation in the resonant frequency in both the leaf spring resonant mode and the resonant mode of the movable portion, and it is possible to stably obtain a desired driving characteristic.

In addition, in an example where, when viewed in the Z-axis direction, in the first connection region 372, the outer edge opposite the movable portion 32 extends along the Y-axis direction and only the outer edge on the movable portion 32 side is bent toward the movable portion 32 side, and in the second connection region 382, the outer edge opposite the movable portion 32 extends along the Y-axis direction and only the outer edge on the movable portion 32 side is bent toward the movable portion 32 side, the following problem can occur. Namely, in this example, each of the connection regions 372 and 382 does not include the bent portion, a width of the first connection region 372 in the X-axis direction increases as the first connection region 372 approaches the first fixing region 371 from a first extending portion 33 side, and a width of the second connection region 382 in the X-axis direction increases as the second connection region 382 approaches the second fixing region 381 from a second extending portion 34 side. For this reason, when the wiring substrate 2 expands or contracts, it is difficult to cause tensile stress or compressive stress acting on the metal substrate 3, to be converted into bending stress. In contrast, in the actuator device 1, since both the first outer edge P1 and the second outer edge P2 in the first connection region 372 are formed at the first bent portion 372c bent toward the movable portion 32 side, and both the third outer edge P3 and the fourth outer edge P4 in the second connection region 382 are formed at the second bent portion 382c bent toward the movable portion 32 side, when the wiring substrate 2 expands or contracts, tensile stress or compressive stress acting on the metal substrate 3 can be effectively converted into bending stress acting on each of the bent portions 372c and 382c.

In the actuator device 1, the portion 372a extending linearly from the first extending portion 33 is connected to the first bent portion 372c, and the portion 382a extending linearly from the second extending portion 34 is connected to the second bent portion 382c. Accordingly, it is possible to suppress the influence of deformation of the first bent portion 372c on the connection portion between the first extending portion 33 and the first coupling portion 35. Similarly, it is possible to suppress the influence of deformation of the second bent portion 382c on the connection portion between the second extending portion 34 and the second coupling portion 36.

In the actuator device 1, the portion 372b having a positional relationship in which the portion 372b intersects the portion 372a, and extending linearly from the first fixing region 371 is connected to the first bent portion 372c, and the portion 382b having a positional relationship in which the portion 382b intersects the portion 382a, and extending linearly from the second fixing region 381 is connected to the second bent portion 382c. Accordingly, when the wiring substrate 2 expands or contracts, for example, because of a change in environmental temperature, it is possible to locally deform the first bent portion 372c and the second bent portion 382c in the first connection region 372 and the second connection region 382. Therefore, it is possible to even further suppress the influence of deformation of the first bent portion 372c on the connection portion between the first extending portion 33 and the first coupling portion 35. Similarly, it is possible to even further suppress the influence of deformation of the second bent portion 382c on the connection portion between the second extending portion 34 and the second coupling portion 36. In addition, since each of the portions 372b and 382b has a shape extending linearly, both when the wiring substrate 2 expands and when the wiring substrate 2 contacts, for example, because of a change in environmental temperature, it is possible to appropriately deform the first bent portion 372c and the second bent portion 382c.

In the actuator device 1, when viewed in the Z-axis direction, the angle formed by the portion 372b with respect to the Y-axis direction is larger than 0 degrees and 90 degrees or less, and the angle formed by the portion 382b with respect to the Y-axis direction is larger than 0 degrees and 90 degrees or less. Accordingly, when the wiring substrate 2 expands or contracts, for example, because of a change in environmental temperature, it is possible to reliably deform the first bent portion 372c and the second bent portion 382c in the first connection region 372 and the second connection region 382. Specifically, since the direction in which the portion 372b extends intersects the above-described direction in which the first fixing region 371 moves, and the direction in which the portion 382b extends intersects the above-described direction in which the second fixing region 381 moves, it is possible to deform each of the bent portions 372c and 382c according to a deformation amount of the wiring substrate 2.

In the actuator device 1, when viewed in the Z-axis direction, each of the first outer edge P1 and the second outer edge P2 is curved to protrude opposite the movable portion 32, and each of the third outer edge P3 and the fourth outer edge P4 is curved to protrude opposite the movable portion 32. Accordingly, when the wiring substrate 2 expands or contracts, for example, because of a change in environmental temperature, since it is possible to reduce the concentration of stress in the first bent portion 372c and in the second bent portion 382c, it is possible to prevent damage to the first bent portion 372c and to the second bent portion 382c.

In the actuator device 1, the first fixing region 371 and the second fixing region 381 are separated from each other with the region Rh interposed therebetween, the region Rh being located opposite the main body portion 31 with respect to the movable portion 32 in the direction in which the main body portion 31 and the movable portion 32 are arranged. Accordingly, for example, when the movable portion 32 is irradiated with light, it is possible to reduce the risk of generation of stray light caused by the reflection of the light by the first fixing region 371 or the second fixing region 381. In addition, since the first fixing region 371 and the second fixing region 381 are separated from each other, also, in the metal substrate 3 that is likely to be affected by the expansion and contraction of the wiring substrate 2, the first bent portion 372c in the first connection region 372 deforms, and the second bent portion 382c in the second connection region 382 deforms, and as a result, it is possible to suppress a change in the resonant frequency of the metal substrate 3.

Modification Examples

The embodiment of the present invention has been described above, and the present invention is not limited to the embodiment described above. For example, each of the first fixing region 371, the second fixing region 381, and the third fixing region 391 may be a region fixed to the wiring substrate 2. Each of the fixing regions 371, 381, and 391 may include, for example, only a region that faces a portion of the wiring substrate 2 and that is fixed to the wiring substrate 2.

The shapes of the first connection region 372 and the second connection region 382 are not limited to those of the above embodiment. For example, when viewed in the Z-axis direction, each of the first outer edge P1 and the second outer edge P2 at the first bent portion 372c of the first connection region 372 may be bent in a V shape to protrude opposite the movable portion 32. Each of the third outer edge P3 and the fourth outer edge P4 at the second bent portion 382c of the second connection region 382 may also be bent in a V shape to protrude opposite the movable portion 32. In addition, for example, each of the angle θ1 formed by the portion 372b with respect to the Y-axis direction and the angle θ2 formed by the portion 382b with respect to the Y-axis direction may be larger than 90 degrees. In addition, for example, the first connection region 372 may not include the portion 372b, and the first bent portion 372c connected to the portion 372a may be directly connected to the first fixing region 371. The second connection region 382 may also not include the portion 382b, and the second bent portion 382c connected to the portion 382a may be directly connected to the second fixing region 381.

Figure 8:
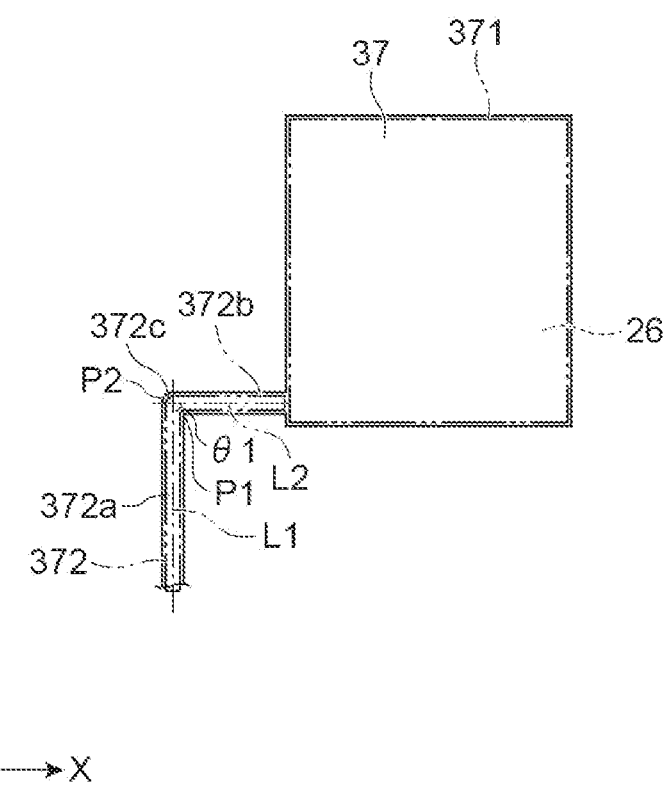
FIG. 8 is a plan view of a portion of a wiring substrate and a metal substrate of a first modification example.

In addition, in the example illustrated in FIG. 8, the portion 372a extends along the Y-axis direction, and the portion 372b extends along the X-axis direction. The angle θ1 formed by the portion 372b with respect to the Y-axis direction is approximately 90 degrees. The portion 382b of the second connection region 382 may also have the same configuration as that of the portion 372b illustrated in FIG. 8. In addition, for example, the portion 372a of the first connection region 372 may be inclined toward the movable portion 32 side with respect to the first extending portion 33, and the portion 382a of the second connection region 382 may be inclined toward the movable portion 32 side with respect to the second extending portion 34. In addition, for example, the first extending portion 33 may be inclined toward the movable portion 32 side with respect to the Y-axis direction, and the portion 372a may be further inclined toward the movable portion 32 side with respect to the first extending portion 33. The second extending portion 34 may be inclined toward the movable portion 32 side with respect to the Y-axis direction, and the portion 382b may be further inclined toward the movable portion 32 side with respect to the second extending portion 34.

Figure 9:
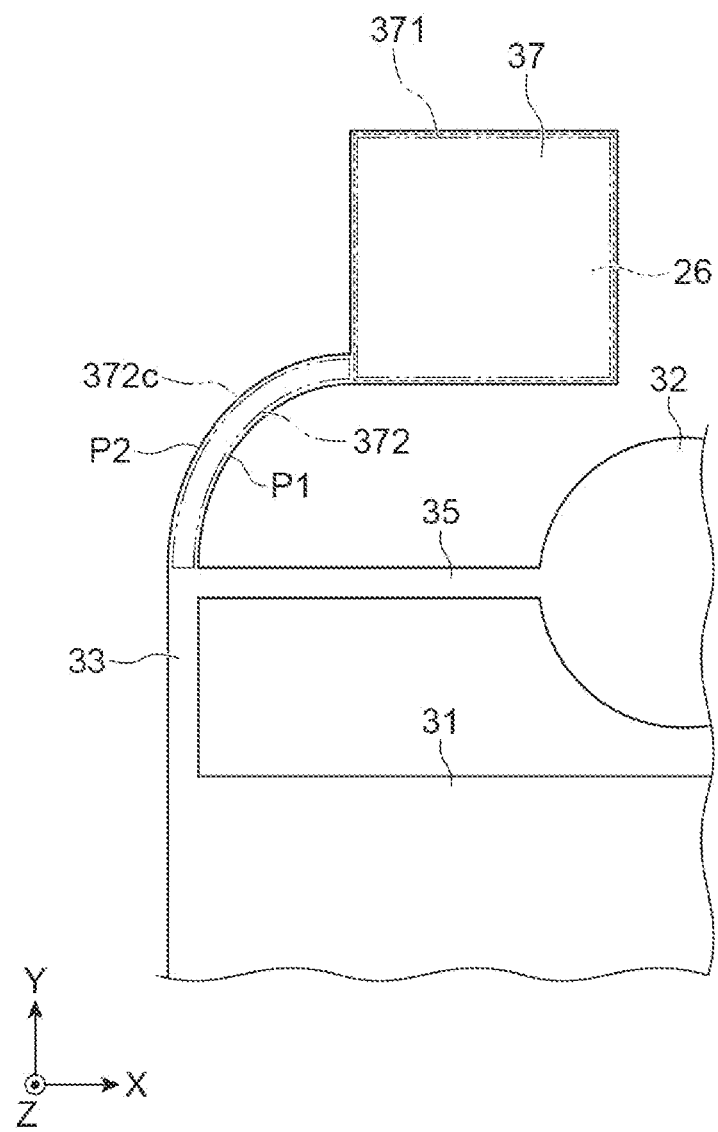
FIG. 9 is a plan view of a portion of a wiring substrate and a metal substrate of a second modification example.

In addition, the first connection region 372 may not include, for example, one of the portion 372a and the portion 372b, and may not include, for example, both the portion 372a and the portion 372b. In addition, the second connection region 382 may not include, for example, one of the portion 382a and the portion 382b, and may not include, for example, both the portion 382a and the portion 382b. As one example, the example illustrated in FIG. 9 is different from the above embodiment in that the first connection region 372 includes the first bent portion 372c which is continuous from each of the first extending portion 33 and the first fixing region 371. The first connection region 372 does not include the portion 372a and the portion 372b. The first bent portion 372c is curved between the first extending portion 33 and the first fixing region 371 to protrude opposite the movable portion 32. Incidentally, the second connection region 382 may also have the same configuration as that of the first connection region 372 illustrated in FIG. 9.

In the above embodiment, one third connection portion 39 forms the third connection portion connected to the main body portion, but the third connection portion may include a plurality of the third connection portions 39. As one example, the third connection portion may include two third connection portions 39, and the two third connection portions 39 may be located on the one side in the Y-axis direction with respect to the main body portion 31, and disposed to be line symmetric with respect to the straight line passing through the center of the optical surface 51 along the Y-axis direction.

The shape of the metal substrate 3 is not limited to the above embodiment. For example, the first fixing region 371 and the second fixing region 381 may be coupled to each other. Also, in that case, since a thickness of the wiring substrate 2 is overwhelmingly larger than a thickness of the metal substrate 3, and the difference in thermal expansion coefficient between the wiring substrate 2 and the metal substrate 3 is large, tensile stress or compressive stress is applied to the metal substrate 3, but as described above, since the first bent portion 372c is provided in the connection region 372, and the second bent portion 382c is provided in the connection region 382, it is possible to stably obtain a desired driving characteristic.

Figure 10:
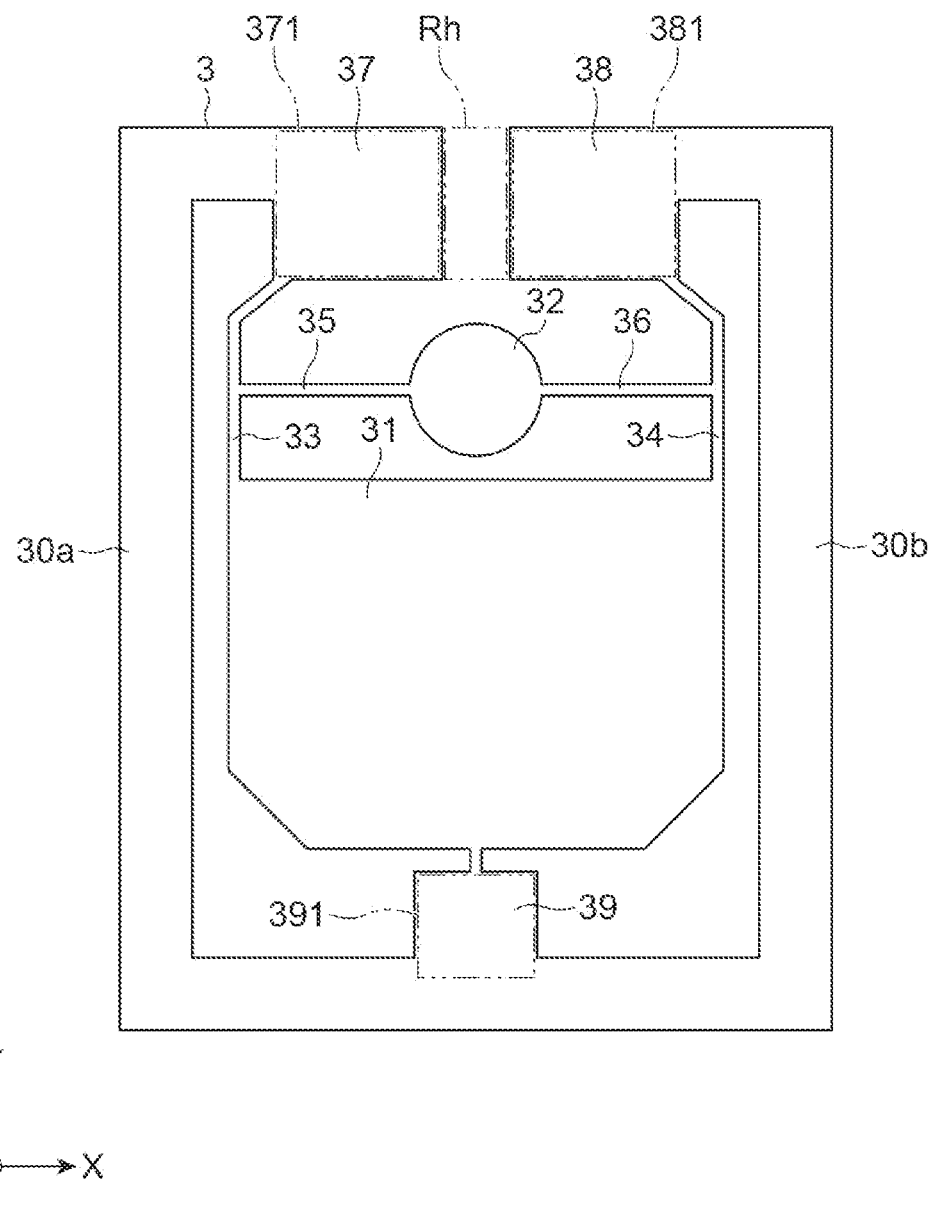
FIG. 10 is a plan view of a metal substrate of a third modification example.

In addition, for example, the third fixing region 391 and the first fixing region 371 of the metal substrate 3 may be coupled to each other, and the third fixing region 391 and the second fixing region 381 may be coupled to each other. In the example illustrated in FIG. 10, the metal substrate 3 further includes a first intermediate portion 30a and a second intermediate portion 30b. The first intermediate portion 30a is connected to the first fixing region 371 and to the third fixing region 391. The first intermediate portion 30a includes a portion facing a portion of the wiring substrate 2. Incidentally, in the example illustrated in FIG. 10, the illustration of the wiring substrate 2 and the like is omitted. As one example, the first intermediate portion 30a has a C shape surrounding the main body portion 31 when viewed in the Z-axis direction. The second intermediate portion 30b is connected to the second fixing region 381 and to the third fixing region 391. The second intermediate portion 30b includes a portion facing a portion of the wiring substrate 2. As one example, the second intermediate portion 30b has a C shape surrounding the main body portion 31 when viewed in the Z-axis direction. According to the present modification example, it is possible to improve handleability of the metal substrate 3 during manufacturing of the actuator device 1. Incidentally, in the present modification example, for example, the first bonding member 4 may be disposed between the first intermediate portion 30a and the portion of the wiring substrate 2 facing the first intermediate portion 30a and between the second intermediate portion 30b and the portion of the wiring substrate 2 facing the second intermediate portion 30b, and all of the fixing regions 371, 381, and 391, the first intermediate portion 30a, and the second intermediate portion 30b may be fixed to the wiring substrate 2. Accordingly, it is possible to increase bonding strength between the wiring substrate 2 and the metal substrate 3. In addition, in the present modification example, for example, only the fixing regions 371, 381, and 391 may be fixed to the wiring substrate 2.

The wiring substrate 2 is not limited to the shape of the above embodiment, and for example, the wiring substrate 2 may include a recessed portion in which a central portion is recessed opposite the metal substrate 3 with respect to the placement surface 2a, instead of an opening. In that case, each of the second region R2 and the third region R3 may face the recessed portion of the wiring substrate 2. In addition, for example, the wiring substrate 2 may include a plurality of column portions instead of an opening. In that case, each of the second region R2 and the third region R3 may face the wiring substrate 2. In addition, in the above embodiment, the wiring substrate 2 that supports the metal substrate 3 has been provided as an example, but the metal substrate 3 may be supported by, for example, a support body including a single or a plurality of members.

In the above embodiment, torsional vibration (torsional resonance) is induced in the first coupling portion 35 and in the second coupling portion 36, and the movable portion 32 oscillates around an X axis, but the operation mode of the movable portion 32 is not particularly limited. As one example, the actuator device 1 may be subjected to a mode in which the first coupling portion 35 and the second coupling portion 36 are moved along the Z-axis direction (moved in a translational manner) by the generation of periodic plate waves, thereby moving the movable portion 32 along the Z-axis direction (hereinafter, referred to as a "second resonant mode"), in addition to a mode in which the movable portion 32 and the optical surface 51 oscillate (hereinafter, referred to as a "first resonant mode") or instead of the first resonant mode. In that case, during the first resonant mode, an oscillation angle and a phase of the movable portion 32 may be detected by the piezoelectric detection element 7, and during the second resonant mode, a displacement amount and a phase of the movable portion 32 may be detected by the piezoelectric detection element 7.

In the above embodiment, the optical function unit 5 has the optical surface 51 that is a mirror surface, but the optical function unit 5 may be, for example, a reflection type diffraction grating, a transmission type diffraction grating, an optical filter, or the like. In addition, in the above embodiment, the piezoelectric drive element 6 is disposed on the placement surface 31a of the metal substrate 3, and the piezoelectric detection element 7 is disposed on the piezoelectric drive element 6, but the piezoelectric detection element 7 may be disposed on the placement surface 31a of the metal substrate 3, and the piezoelectric drive element 6 may be disposed on the piezoelectric detection element 7. In addition, in the above embodiment, the actuator device 1 includes the piezoelectric drive element 6 as a vibration element, but the vibration element may include a vibration source that vibrates in response to a drive signal, and is not limited to a piezoelectric drive type. For example, the vibration element may be an electromagnetic drive type that includes a magnet on the main body portion 31 of the metal substrate 3 and a coil at another location other than the metal substrate 3 (alternatively, includes a coil on the main body portion 31 of the metal substrate 3 and a magnet at another location other than the metal substrate 3). The actuator device 1 may include the wiring substrate 2, the metal substrate 3, and the piezoelectric drive element 6. For example, the connector 24, the wire 11, and the wire 12 may not be attached to the actuator device 1. In addition, the actuator device 1 may not include, for example, the first bonding member 4 and the second bonding member 8, and may not include, for example, the piezoelectric detection element 7.

An actuator device according to one aspect of the present disclosure includes: a support body; a metal substrate supported by the support body; and a vibration element disposed on a main body portion included in the metal substrate. The metal substrate further includes a movable portion, a first extending portion and a second extending portion extending from the main body portion such that the movable portion is located between the first extending portion and the second extending portion, a first coupling portion coupling the first extending portion and the movable portion, a second coupling portion coupling the second extending portion and the movable portion, a first connection portion connected to the first extending portion, a second connection portion connected to the second extending portion, and a third connection portion connected to the main body portion. The first connection portion includes a first fixing region fixed to the support body, and a first connection region connected to the first extending portion and to the first fixing region. The second connection portion includes a second fixing region fixed to the support body, and a second connection region connected to the second extending portion and to the second fixing region. The third connection portion includes a third fixing region fixed to the support body, and a third connection region connected to the main body portion and to the third fixing region. The first connection region includes a first bent portion. The second connection region includes a second bent portion. The first bent portion has a first outer edge on a movable portion side, and a second outer edge opposite the movable portion. The second bent portion has a third outer edge on the movable portion side, and a fourth outer edge opposite the movable portion. Each of the first outer edge and the second outer edge is bent toward the movable portion side when viewed in a thickness direction of the metal substrate. Each of the third outer edge and the fourth outer edge is bent toward the movable portion side when viewed in the thickness direction of the metal substrate.

In the actuator device, even when the support body expands or contracts, for example, because of a change in environmental temperature, since the first bent portion and the second bent portion in the first connection region and the second connection region deform, unwanted stress is unlikely to act on the first coupling portion, the second coupling portion, and the main body portion via the first fixing region and the second fixing region that are fixed to the support body, and unwanted stress is unlikely to act on the main body portion via the third fixing region fixed to the support body, so that a change in the resonant frequency of the metal substrate is suppressed. Therefore, according to the actuator device, for example, even when the environmental temperature changes, it is possible to stably obtain a desired driving characteristic.

In the actuator device of the present disclosure, the first connection region may further include a first portion extending linearly from the first extending portion, the second connection region may further include a second portion extending linearly from the second extending portion, the first portion may be connected to the first bent portion, and the second portion may be connected to the second bent portion. Accordingly, it is possible to suppress the influence of deformation of the first bent portion on a connection portion between the first extending portion and the first coupling portion. Similarly, it is possible to suppress the influence of deformation of the second bent portion on a he connection portion between the second extending portion and the second coupling portion.

In the actuator device of the present disclosure, the first connection region may further include a third portion extending linearly from the first fixing region, the second connection region may further include a fourth portion extending linearly from the second fixing region, the third portion may have a positional relationship in which the third portion intersects the first portion, and be connected to the first bent portion, and the fourth portion may have a positional relationship in which the fourth portion intersects the second portion, and be connected to the second bent portion. Accordingly, when the support body expands or contracts, for example, because of a change in environmental temperature, it is possible to locally deform the first bent portion and the second bent portion in the first connection region and the second connection region.

In the actuator device of the present disclosure, when viewed in the thickness direction of the metal substrate, an angle formed by the third portion with respect to a direction in which the main body portion and the movable portion are arranged may be larger than 0 degrees and 90 degrees or less, and when viewed in the thickness direction of the metal substrate, an angle formed by the fourth portion with respect to the direction in which the main body portion and the movable portion are arranged may be larger than 0 degrees and 90 degrees or less. Accordingly, when the support body expands or contracts, for example, because of a change in environmental temperature, it is possible to reliably deform the first bent portion and the second bent portion in the first connection region and the second connection region.

In the actuator device of the present disclosure, when viewed in the thickness direction of the metal substrate, each of the first outer edge and the second outer edge may be curved to protrude opposite the movable portion, and when viewed in the thickness direction of the metal substrate, each of the third outer edge and the fourth outer edge may be curved to protrude opposite the movable portion. Accordingly, when the support body expands or contracts, for example, because of a change in environmental temperature, since it is possible to reduce the concentration of stress in the first bent portion and in the second bent portion, it is possible to prevent damage to the first bent portion and to the second bent portion.

In the actuator device of the present disclosure, the first fixing region and the second fixing region may be separated from each other with a region interposed between the first fixing region and the second fixing region, the region being located opposite the main body portion with respect to the movable portion in a direction in which the main body portion and the movable portion are arranged. Accordingly, for example, when the movable portion is irradiated with light, it is possible to reduce the risk of generation of stray light caused by the reflection of the light by the first fixing region or the second fixing region.

In the actuator device of the present disclosure, the metal substrate may further include a first intermediate portion connected to the third fixing region and to the first fixing region, and a second intermediate portion connected to the third fixing region and to the second fixing region. Accordingly, it is possible to improve handleability of the metal substrate during manufacturing of the actuator device.

According to one aspect of the present disclosure, it is possible to provide the actuator device in which a desired driving characteristic can be stably obtained, for example, even when the environmental temperature changes.

What is claimed is:

1. An actuator device comprising:
a support body;
a metal substrate supported by the support body; and
a vibration element disposed on a main body portion included in the metal substrate,
wherein the metal substrate further includes a movable portion, a first extending portion and a second extending portion extending from the main body portion such that the movable portion is located between the first extending portion and the second extending portion, a first coupling portion coupling the first extending portion and the movable portion, a second coupling portion coupling the second extending portion and the movable portion, a first connection portion connected to the first extending portion, a second connection portion connected to the second extending portion, and a third connection portion connected to the main body portion,
the first connection portion includes a first fixing region fixed to the support body, and a first connection region connected to the first extending portion and to the first fixing region,
the second connection portion includes a second fixing region fixed to the support body, and a second connection region connected to the second extending portion and to the second fixing region,
the third connection portion includes a third fixing region fixed to the support body, and a third connection region connected to the main body portion and to the third fixing region,
the first connection region includes a first bent portion,
the second connection region includes a second bent portion,
the first bent portion has a first outer edge on the movable portion side, and a second outer edge opposite the movable portion,
the second bent portion has a third outer edge on the movable portion side, and a fourth outer edge opposite the movable portion,
when viewed in a thickness direction of the metal substrate, each of the first outer edge and the second outer edge is bent toward the movable portion side on the first fixing region side relative to the first coupling portion in a direction in which the main body portion and the movable portion are arranged, and
when viewed in the thickness direction of the metal substrate, each of the third outer edge and the fourth outer edge is bent toward the movable portion side on the second fixing region side relative to the second coupling portion in the direction in which the main body portion and the movable portion are arranged.

2. The actuator device according to claim 1,
wherein the first connection region further includes a first portion extending linearly from the first extending portion,
the second connection region further includes a second portion extending linearly from the second extending portion,
the first portion is connected to the first bent portion, and
the second portion is connected to the second bent portion.

3. The actuator device according to claim 2,
wherein the first connection region further includes a third portion extending linearly from the first fixing region,
the second connection region further includes a fourth portion extending linearly from the second fixing region,
the third portion has a positional relationship in which the third portion intersects the first portion, and is connected to the first bent portion, and
the fourth portion has a positional relationship in which the fourth portion intersects the second portion, and is connected to the second bent portion.

4. The actuator device according to claim 3,
wherein when viewed in the thickness direction of the metal substrate, an angle formed by the third portion with respect to the direction in which the main body portion and the movable portion are arranged is larger than 0 degrees and 90 degrees or less, and
when viewed in the thickness direction of the metal substrate, an angle formed by the fourth portion with respect to the direction in which the main body portion and the movable portion are arranged is larger than 0 degrees and 90 degrees or less.

5. The actuator device according to claim 1, wherein when viewed in the thickness direction of the metal substrate, each of the first outer edge and the second outer edge is curved to protrude opposite the movable portion, and when viewed in the thickness direction of the metal substrate, each of the third outer edge and the fourth outer edge is curved to protrude opposite the movable portion.

6. The actuator device according to claim 1, wherein the first fixing region and the second fixing region are separated from each other with a region interposed therebetween, the region being located opposite the main body portion with respect to the movable portion in the direction in which the main body portion and the movable portion are arranged.

7. The actuator device according to claim 1, wherein the metal substrate further includes a first intermediate portion connected to the third fixing region and to the first fixing region, and a second intermediate portion connected to the third fixing region and to the second fixing region.

* * * * *